(12) United States Patent
Dirnberger et al.

(10) Patent No.: US 10,556,200 B2
(45) Date of Patent: Feb. 11, 2020

(54) METHOD FOR PRODUCING FILTER BELLOWS

(71) Applicant: MANN+HUMMEL GmbH, Ludwigsburg (DE)

(72) Inventors: Timo Dirnberger, Marbach (DE); Markus Roehrig, Landshut (DE); Daniel Schmid, Sachsenheim (DE); Sven Epli, Heilbronn (DE); Markus Schmidl, Pilsting (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 89 days.

(21) Appl. No.: 15/803,916

(22) Filed: Nov. 6, 2017

(65) Prior Publication Data

US 2018/0056225 A1 Mar. 1, 2018

Related U.S. Application Data

(63) Continuation of application No. PCT/EP2016/058438, filed on Apr. 15, 2016.

(30) Foreign Application Priority Data

May 4, 2015 (DE) .................. 10 2015 005 565

(51) Int. Cl.
*B01D 46/10* (2006.01)
*B01D 39/18* (2006.01)
(Continued)

(52) U.S. Cl.
CPC ........... *B01D 46/521* (2013.01); *B01D 39/18* (2013.01); *B01D 46/0001* (2013.01); *B01D 2275/206* (2013.01); *B01D 2279/60* (2013.01)

(58) Field of Classification Search
CPC .. B01D 46/0001; B01D 46/10; B01D 46/521; B01D 39/18; B01D 2275/206; B01D 2279/60
(Continued)

(56) References Cited

U.S. PATENT DOCUMENTS 3,490,211 A * 1/1970 Cartier .................. B01D 46/10
55/487
5,622,583 A 4/1997 Ernst et al.
(Continued)

FOREIGN PATENT DOCUMENTS

DE 20310833 U1 11/2004
DE 102010053200 A1 6/2012
(Continued)

*Primary Examiner* — Minh Chau T Pham
(74) *Attorney, Agent, or Firm* — James Hasselbeck

(57) ABSTRACT

In a method for producing two or more filter bellows, a bellows with a filter medium with fold edges is provided, wherein the filter medium is running in a running direction. A cutting path is carried out in the bellows with the filter medium in a direction that, at least in some regions, is transverse relative to the fold edges such that the filter bellows are produced in parallel and the cutting path creates end edge faces and/or side faces of the filter bellows and the filter bellows are embodied lying adjacent to each other and symmetrical or point-symmetrical relative to each other in the running direction and/or transverse to the running direction. A filter element with such a filter bellows and a filter system with such a filter element and filter bellows arranged in a filter housing are provided.

17 Claims, 7 Drawing Sheets

(51) Int. Cl.
*B01D 46/52* (2006.01)
*B01D 46/00* (2006.01)

(58) Field of Classification Search
USPC ......... 55/498, 502, 521, 529, 487, 497, 500, 55/501, 514, 527, 385.3; 123/198 E
See application file for complete search history.

(56) References Cited

U.S. PATENT DOCUMENTS

| | | |
|---|---|---|
| 2008/0107765 A1 | 5/2008 | Considine et al. |
| 2015/0114191 A1 | 4/2015 | Roehrig |
| 2016/0023137 A1* | 1/2016 | Sorger ............... B01D 46/4236 210/435 |
| 2016/0263513 A1 | 9/2016 | Pflueger et al. |
| 2016/0263514 A1* | 9/2016 | Epli ....................... B01D 46/10 |
| 2017/0182448 A1* | 6/2017 | Sudermann ............ B01D 46/10 |
| 2017/0182588 A1* | 6/2017 | Sudermann ........ B01D 46/0005 |
| 2018/0339254 A1* | 11/2018 | Kaufmann ......... B01D 46/0005 |

FOREIGN PATENT DOCUMENTS

| | | | |
|---|---|---|---|
| DE | 102013218219 A1 * | 3/2015 | ............. B01D 46/52 |
| DE | 102014016672 A1 | 5/2015 | |
| EP | 2857573 A1 | 4/2015 | |

\* cited by examiner

METHOD FOR PRODUCING FILTER BELLOWS

CROSS-REFERENCE TO RELATED APPLICATIONS

This application is a continuation application of international application No. PCT/EP2016/058438 having an international filing date of 15 Apr. 2016 and designating the United States, the international application claiming a priority date of 4 May 2015, based on prior filed German patent application No. 10 2015 005 565.8, the entire contents of the aforesaid international application and the aforesaid German patent application being incorporated herein by reference.

BACKGROUND OF THE INVENTION

The invention concerns a method for producing filter bellows from a zigzag folded filter medium, in particular for use as flat air filter in an internal combustion engine, in particular of a motor vehicle.

End face folds are the two outer folds of opposite end faces of the filter bellows of a filter element. End face rims are the two free rims of the filter medium of which the filter bellows is formed and which extend along the end face folds and delimit them at the end faces of the filter bellows. End edges of the filter bellows are the two other free rims of the filter bellows which extend between the end face rims and extend in accordance with the folding of the filter bellows. The fold edges are the edges along which the filter medium is folded. In a commercially available zigzag folded, approximately parallelepipedal filter bellows, the end face rims and the fold edges in general are straight and extend parallel to each other. Viewing the filter bellows from the side, the end edges extend in a zigzag shape and perpendicular to the end face rims and the fold edges. Prior to folding the filter medium, the end edges of the filter bellows, which later on exhibits an approximately parallelepipedal imaginary envelope, extend straight and parallel to each other. The imaginary envelope is defined by the end edges, the neighboring fold edges or end face rims at the clean fluid side of the filter bellows and the neighboring fold edges or end face rims at the raw fluid side.

In filter bellows of flat filter elements, the filter media are not closed, i.e., the end face folds like the end edges are not connected to each other. In contrast thereto, in filter bellows of round filter elements the filter media are closed, i.e., their end face folds are connected to each other. Filter bellows of flat filter elements can be planar but also can be provided with bends in different directions.

Rectangular or trapezoidal filter bellows for flat filter elements or filter bellows with cut-off corners that are produced from an endless running web of a filter medium are prior art. By laser cutting, for example, a plurality of geometries is conceivable which however partially entail a significant paper loss and thus waste of filter medium.

SUMMARY OF THE INVENTION

It is an object of the invention to provide a cost-efficient method for producing a filter bellows that enables production of filter bellows for confined installation spaces.

The aforementioned object is solved according to an aspect of the invention by a method for producing at least two filter bellows from a bellows with a filter medium with fold edges that is running in a running direction, wherein the filter bellows are produced in parallel.

Beneficial embodiments and advantages of the invention result from the further claims, the description, and the drawing.

A method for producing at least two filter bellows from a bellows comprising a filter medium with fold edges that is running in a running direction is proposed. In this context, the filter bellows are produced in parallel in that in the bellows a cutting path between end edge faces and/or side faces of the filter bellows is performed transverse, at least in some regions, relative to the fold edges such that the filter bellows in running direction and/or transverse relative to the running direction are embodied lying adjacent to each other and symmetrical or point-symmetrical relative to each other.

The method according to the invention makes it possible to produce filter bellows, for example, from an endless running web of a bellows comprising a filter medium, comprising zigzag shaped erected folds, in such a way that the cutting scrap and thus the waste of filter medium is reduced in comparison to conventional production processes. This can be achieved in accordance with the proposed method in that the filter bellows in the running direction and/or transverse relative to the running direction are embodied lying adjacent to each other and symmetrical or point-symmetrical to each other. A shape is considered point-symmetrical when by point reflection in a point of symmetry it is reproduced on itself. In other words, the shape by simple mirroring at two planes that are perpendicular to each other can be reproduced on itself.

In this way, across the width of the bellows several filter bellows can be produced adjacent to each other. Also, by a suitable configuration of the cut edges of the filter bellows, it is possible to cut the filter bellows in the running direction of the bellows in direct sequence from the filter medium without producing cutting scrap there between. It is thus expedient to carry out a symmetrical cut, for example, by means of a laser, in order to produce no additional costs in respect to a standard filter element because, for example, at least two filter bellows for filter elements can then be produced adjacent to each other and/or one behind the other from a large cut bellows in the manufacture of the filter elements.

The folds can be sealed along the end edges laterally by means of at least one sealant bead, respectively. For this purpose, a hot melt adhesive can be beneficially employed. Alternatively, a sealing action by means of a lateral band is conceivable. In case that one or a plurality of lateral bands are employed for the lateral sealing action, the lateral bands are preferably produced of a flexible nonwoven strip that in particular is glued to the correlated end edge. The use of the hot melt adhesive represents however a preferred cost-efficient possibility that also has the advantage of flexibility and design freedom as great as possible.

Between a first and a second element section of the filter bellows, an additional element section can be arranged wherein on one or both of the oppositely positioned end edge faces of the additional element section the directional change is realized. For example, an end edge face can be continued as a flat surface while the oppositely positioned end edge face is continued at an angle that can also be smaller than 180° until the end edge face then meets an end edge face of the second element section.

In this context, the directional change at a boundary surface can be realized between the first element section and the second element section. In this way, the fold edges, for example, can be continued in parallel while the end edge faces are bent at an angle and also continue substantially parallel to each other. In another embodiment, the two end edge faces can however also be continued non-parallel. In this way, directional changes of end edge faces can be designed very flexibly and in a modular fashion.

In a further embodiment, for a plurality of element sections of the filter element the directional change at a boundary surface can be realized between the first element section and the additional element section and/or at a boundary surface between the additional element section and the second element section. In this way, it is possible that, for example, the first and the second element sections each are embodied rectangular, but with different lengths of the folds, while the intermediately arranged element section carries out the transition of the end edge faces from the first element section to the second element section and the directional change is performed precisely between the element sections, respectively.

The directional change of at least one end edge face can have an angle smaller than 180° measured between the end edge faces outside of the filter bellows. In this way, it is possible, for example, to transition from a narrower element section to a wider element section or to simply continue an element section with substantially parallel end edge faces as element section with end edge faces that are also substantially parallel but continued at a slant. In this way, almost rectangular element sections with different depths can also be adjoined or continued.

Alternatively, the directional change can also have on at least one end edge face a concavely curved section, viewed from outside of the filter bellows. In this way, also element sections with curved end edge faces can be realized which can adapt very flexibly to complex installation space specifications. For example, semi-circular contours or recesses of the filter element can be beneficially realized in this way. In this way, it is also possible to fill, as effectively as possible, by means of the filter element a filter housing that due to the installation space specifications is provided with more complex recesses.

Moreover, the directional change can have at least at one end edge face a convexly curved section, viewed from outside of the filter bellows. In this way, as with concavely curved sections, element sections with curved end edge faces can also be produced that outwardly deviate from a flat end edge face and bulge outwardly. In this way, they can be very flexibly adjusted to more complex installation space specifications.

Also, the directional change at least at one end edge face can have sequentially arranged oppositely curved sections, i.e., a convexly curved section followed by a concavely curved section, viewed from outside of the filter bellows. In this way, it is possible to realize a continuously curved course of an end edge face of the filter element and thereby adjust it to constructively beneficially designed filter housing dimensions.

Accordingly, a continuous transition of an end edge face of an element section across an end edge face of an adjoining element section to an end edge face of an adjoining element section can be formed. In this way, filter elements can be produced that have no corners or edges across the course of the end edge faces.

A reinforcement stay can be arranged transversely to the folds in such a way that the fold edges are fixed by the reinforcement stay. In this way, in addition to an end edge sealing action, for example, by a band or an adhesive connection, the folds of the filter medium experience a support action which mechanically stabilizes the filter bellows as a whole and in this way also supports it against flow pressure of the fluid to be filtered. In this way, the service life of the filter element can be beneficially increased.

Further, the folds can have a fold height that differs from each other, in particular a fold height that changes continuously from one side edge to another side edge of the filter bellows. Especially, the fold height can increase or decrease from one end of the filter bellows to another end of the filter bellows so that a wedge-like shape of the height of the filter bellows can be realized which can prove to be beneficial for certain installation specifications in motor vehicles.

In an advantageous embodiment of the method for producing filter bellows, the cutting path along the running direction can experience a directional change. In this way, side faces of a filter element that are not extending in a straight line can be realized which then can be cut correspondingly point-symmetrical in a neighboring filter bellows from the bellows of the filter medium.

In an advantageous embodiment of the method, in this way at least four filter bellows can thus be produced in parallel in that at least one cutting path is carried out transverse to and at least one cutting path along the running direction. This can be realized when the end edge faces and the end face rims are formed correspondingly symmetrical or point-symmetrical.

Beneficially, the cutting path transverse to the running direction can thus experience a directional change. Therefore, on two oppositely positioned end faces symmetrically extending end face rims can be produced which are directly contacting each other when the filter bellows in succession are cut from the continuous filter medium.

Also, it is advantageously possible that the cutting path along the running direction experiences a directional change. In this way, on two oppositely positioned sides of the filter bellows symmetrically extending side faces can be realized which are directly contacting each other when the filter bellows are cut adjacent to each other from the continuous filter medium.

In an advantageous embodiment of the method, a leading end face rim and a rear end face rim of a filter bellows can be embodied complementary to each other by a point symmetry. In this way, on two oppositely positioned end faces complementarily extending end face rims can be realized which are directly contacting each other when the filter bellows in succession are cut from the continuous filter medium.

In a further advantageous embodiment of the method, the directional change can be carried out with one or a plurality of angles of less than 45°. Such a configuration of the cutting path is advantageous when tools other than lasers are used as cutting tools in which the spatial mobility of the cutting head in comparison to a laser is limited.

Beneficially, the directional change can be carried out with one or a plurality of radii. In this way, it is possible to realize very flexibly very different geometries of filter bellows which may be advantageous for tight installation spaces of filter elements.

Advantageously, cellulose can be employed as a filter medium. As filter media, nonwovens are beneficially employed. Cellulose is flexibly utilizable for this purpose and also greatly advantageous in regard to environmental aspects due to the easy degradability.

According to a further aspect, the invention concerns a filter element for filtering a fluid, with a filter bellows that is folded along fold edges in a zigzag shape to folds which extend respectively between oppositely positioned end edges of the filter bellows. In this context, the folds along the end edges, in particular by at least one sealant bead or a lateral band, are laterally sealed wherein at least one of the end edge faces and/or one of the side faces experiences a directional change. Due to the afore described symmetrical or point-symmetrical configuration of end edge faces and/or end face rims, the filter bellows can be cut directly adjacent to each other and/or in succession from the bellows of the filter medium and the cutting scrap and thus waste of the filter medium can be reduced.

Advantages of the solution according to the invention of a filter element with a zigzag folded filter medium for filtering a fluid, in particular of an internal combustion engine, in particular of a motor vehicle, result from an improved installation space utilization of the filter element. Due to the installation space specifications in motor vehicles, various external geometries of a filter element such as a triangular, trapezoidal, double trapezoidal configuration result which are beneficial for utilization in the motor compartment or interior of a motor vehicle. The advantage of the solution according to the invention is that in this context it is not required that a substantially rectangular filter bellows is brought into the desired shape by cutting, or that a filter element is assembled of a plurality of partial elements. Also, cutting geometries known up to now are characterized in that they extend along the end edge and have a cutting angle of greater than 180°. The filter element according to the invention permits substantially greater design freedom and flexibilities in regard to installation in complex installation spaces. The filter element can thus comprise different element sections that permit independent directional changes of the end edge faces relative to each other. Also, it is possible to produce undercuts in the filter bellows in this way. These directional changes also must not necessarily encompass only flat end edge faces but can also be expanded to curved end edge faces. This is particularly advantageous because in this way, in addition to the flexible installation space configuration, a one-piece production of the filter element is enabled and the housing stability can moreover be increased due to a curved shape.

Advantageously, on the periphery of the filter bellows a circumferentially extending seal can be provided. In this way, an effective sealing action of the filter element upon installation in a filter housing and thus the separation between a raw fluid side and a clean fluid side is possible. The effectiveness of a filter system depends substantially on a reliable separation of raw fluid side from the clean fluid side. Primarily, the sealing action must function under very different environmental conditions in use in a motor vehicle which includes great temperature differences, moisture, vibrations, and the like. Leakages of the filter system between the raw fluid side and the clean fluid side can thus be avoided with reasonable reliability.

It can be particularly advantageous therefore to provide as a circumferentially extending seal a seal that is congruently foamed onto the filter bellows, for example, of PUR foam. In this way, it is possible to realize a connection as strong as possible between the filter bellows and the seal that is also substantially permanently seal-tight and in this way ensures the effectiveness of the filter system at least for the service life of the filter element. As a material for the foamed-on seal, for example, polyurethane foams are conceivable which enable a very flexible shape design and, on the other hand, a strong and permanent connection. Also, manufacturing processes can be designed in such a way that conventional filter media can be compatibly foamed around by them and, at the interfaces between plastic material and filter medium, no degradations occur. In this way, great design possibilities of the shape of the filter element can be achieved also.

According to an advantageous embodiment, the circumferential seal can be arranged on end edges and side edges. In this way, it is possible to insert the filter element into the housing bottom part of a filter housing so that the raw fluid side of the filter element ends at a housing edge and the housing top part can be placed on top. In this way, the raw fluid side of the filter element can be sealed beneficially from the clean fluid side of the filter element. When exchanging the filter element, soiling of the clean fluid side of the filter system is avoidable also.

In an advantageous embodiment, on the periphery of the filter bellows a circumferentially extending seal can be provided whose average width in the area of the convexly and/or concavely curved sections of the end edge faces is wider than outside of the sections. In this way, tools for producing the circumferentially extending seal by injection molding on the filter bellows can be designed beneficially and can thus be manufactured cost-efficiently. In this way, the total production costs of a filter element can be reduced.

According to a further aspect, the invention concerns a filter system with a filter element, wherein the filter element is exchangeably arranged in the filter housing that comprises at least a housing bottom part and a housing top part which are detachably connected in a fluid-tight way and wherein the filter element separates fluid-tightly a raw fluid side from a clean fluid side of the filter system. In this way, it is possible to insert the filter element into the housing bottom part of the filter housing so that the raw fluid side of the filter element ends at a housing edge and the housing top part can be placed on top. In this way, the raw fluid side of the filter element can be sealed beneficially from the clean fluid side of the filter element. The filter element is thus easily exchangeable when laden with dirt. Also, with such an arrangement, soiling of the clean fluid side of the filter system can be avoided when exchanging the filter element.

The filter system with the filter element according to the invention enables, when installing the filter system, a beneficial utilization of the available installation space that is especially scarce in the automotive field. For same complex installation space, an increase of the capacity of the filter element is achieved in this way. In connection with clamping of the filter element in a frame, the filter element can be brought into almost any conceivable 3D geometry.

According to a further aspect, the invention concerns the use of the filter system as a flat air filter, in particular as a flat air filter of an internal combustion engine. Conceivable is also the use for other flowing media, for example, oil, fuel, urea, and the like.

BRIEF DESCRIPTION OF THE DRAWINGS

Further advantages result from the following description of the drawings. In the drawings, embodiments of the invention are illustrated. The drawings, description, and the claims contain numerous features in combination. A person of skill in the art will expediently consider the features also individually and combine them to other meaningful combinations.

DETAILED DESCRIPTION

Figure 1:
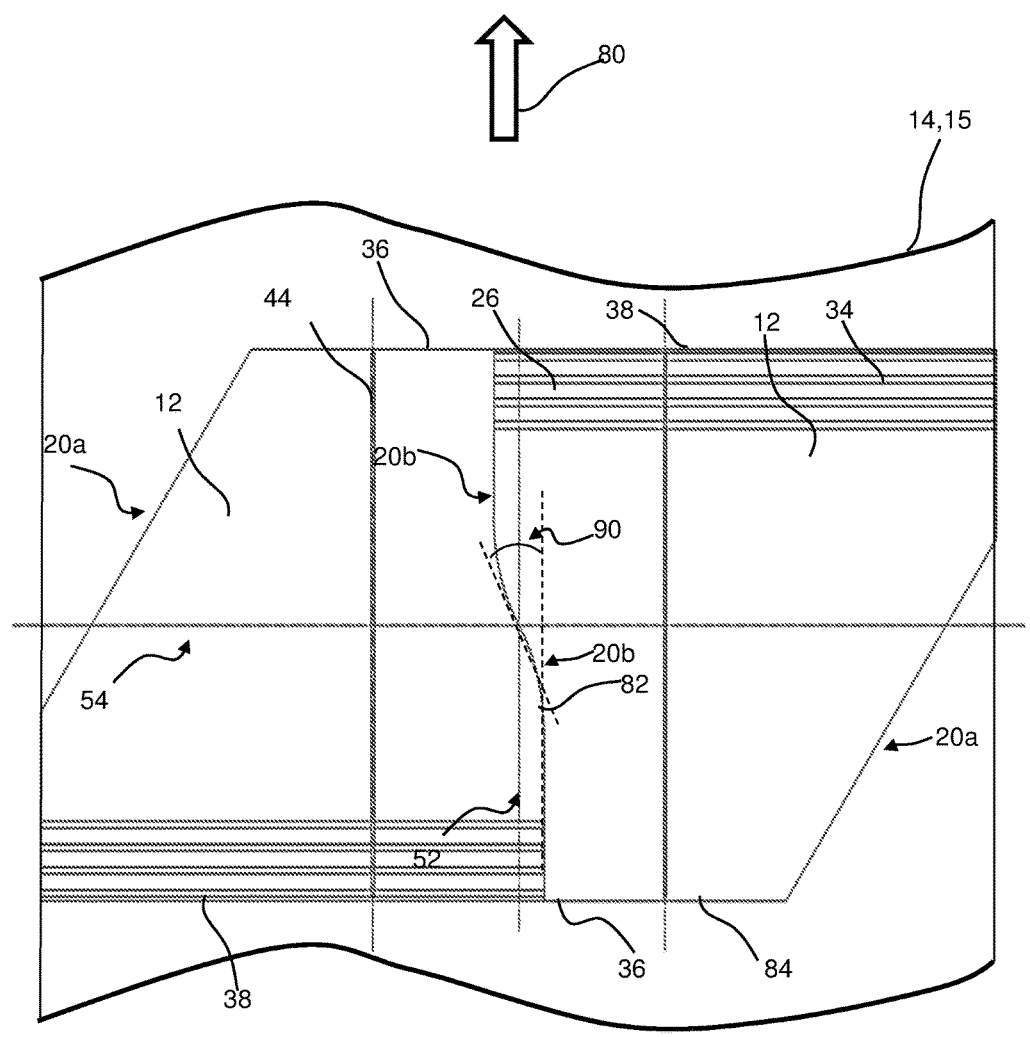
FIG. 1 shows a plan view of a bellows of filter medium from which two adjoining filter bellows are cut according to an embodiment of the invention.

In the Figures, same or same type components are identified with same reference characters. The Figures show only examples and are not to be understood as limiting.

FIG. 1 shows in a plan view a bellows 15 of filter medium 14 from which according to an embodiment of the invention two adjoining filter bellows 12 are cut. According to the method of the present invention, at least two filter bellows 12 are produced in parallel from the bellows 15 comprising the filter medium 14 with fold edges 26 that is running in the running direction 80 in that in the bellows 15 a cutting path 82, 84 between end edge faces 20a, 20b and/or end face rims 36, 38 of the filter bellows 12 is carried out transverse, at least in some regions, relative to the fold edges 26 such that the filter bellows 12 are formed in the running direction 80 and/or transverse to the running direction 80 so as to be lying adjacent to each other and symmetrical or point-symmetrical to each other. The filter bellows 12 are designed in this context with point symmetry when, by sequential mirroring at the planes 52 and 54 that are perpendicular to the image plane of FIG. 1, they can be transformed into themselves by reflection, which is the case for the two filter bellows 12 illustrated in FIG. 1.

The cutting path 82 experiences along the running direction 80 two directional changes transverse to the running direction 80. The directional change is carried out at an angle 90 of less than 45° with a radius so that a continuously extending cut edge is achieved. The magnitude of the angle 90 depends in this context expediently also on the employed cutting tool and the speed of the running filter medium so that these parameters are to be adjusted depending on the configuration of the contours of the filter bellows.

A reinforcement stay 44 is arranged transverse to the folds 34 such that the fold edges 26 are fixed by the reinforcement stay 44.

Advantageously, cellulose can be employed as filter medium 14. Beneficially, nonwovens are used as filter medium 14. For this purpose, cellulose is very flexibly utilizable and also of great advantage in regard to environmental aspects due to the easy degradability.

Figure 2:
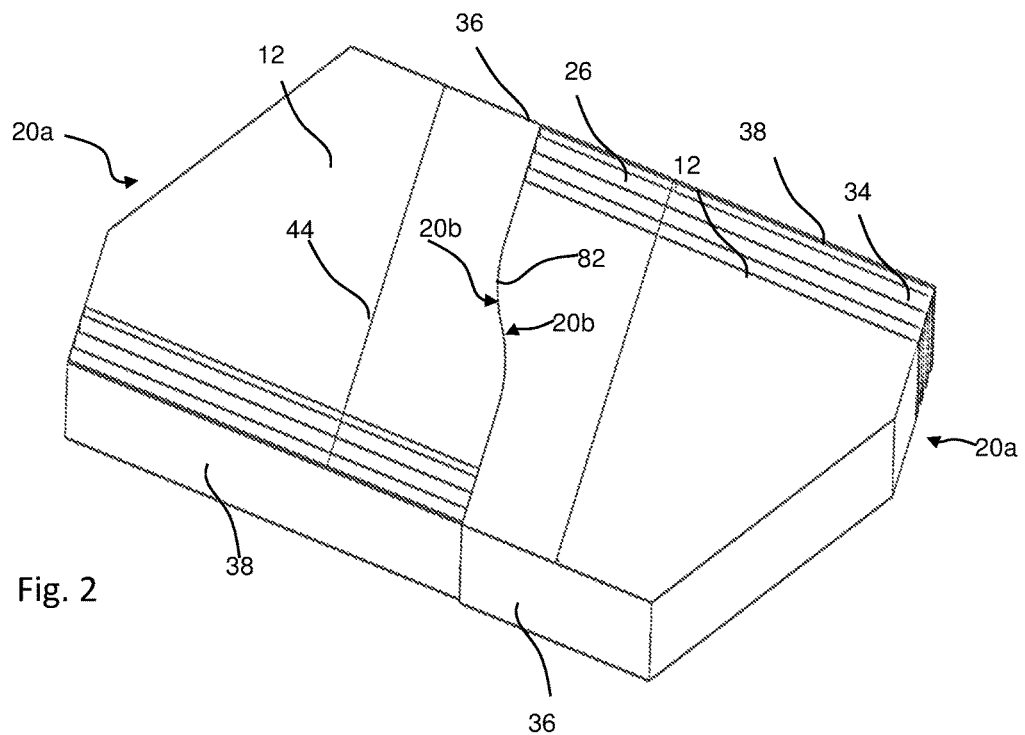
FIG. 2 is an isometric illustration of the two adjoining filter bellows of FIG. 1.

In FIG. 2, the two adjoining filter bellows 12 of FIG. 1 are shown in isometric illustration. Due to the end edge faces 20b extending with point symmetry, the two filter bellows 12 are directly adjoining each other so that, with a suitably guided cutting path 82, they can be cut from the bellows 15 of the filter medium 14 without any cutting scrap at the end edge face 20b, as illustrated in FIG. 1. The erected folds 34 are shown only in a portion of the filter bellows 12. For the remainder of the filter bellows only the outer contours are illustrated.

Figure 3:
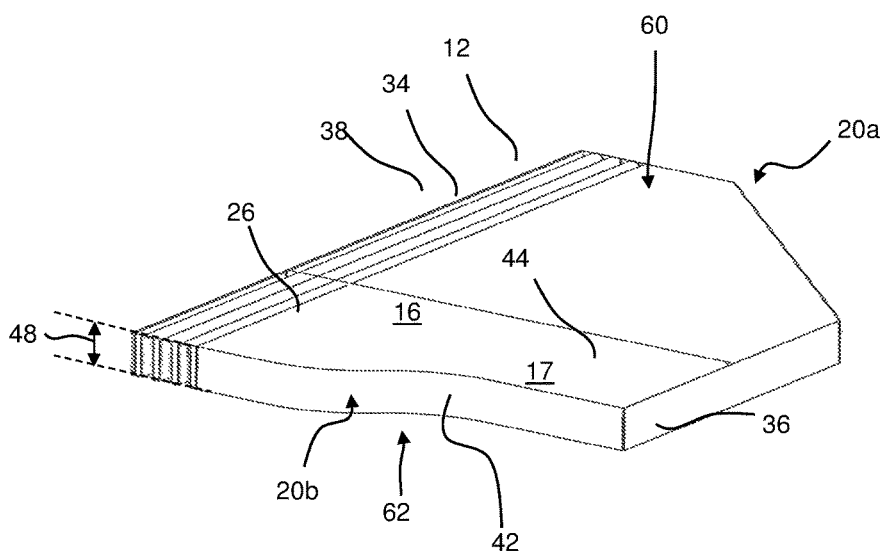
FIG. 3 shows an isometric illustration of a filter bellows of FIG. 1.

FIG. 3 shows an isometric illustration of an individual filter bellows 12 of FIG. 1 or 2. The filter bellows 12 is embodied with two element sections 16, 17. In the left part of the element section 16, the erected folds 34 of the filter medium 14 can be seen, in the remaining area only the fold edges 26 are purely schematically illustrated. The filter bellows 12 is also illustrated purely schematically. In the illustration, for example, the raw fluid side 60 is above the filter bellows 12 while the clean fluid side 62 is arranged below the filter bellows 12. The folds 34 end at both ends of the filter bellows 12 with the end face rims 36 and 38. The folds 34 have a uniform fold height 48. A sealant bead 42 for gluing and sealing the end edges 22a, 22b is applied immediately adjacent at the end edges 22a, 22b.

Figure 4:
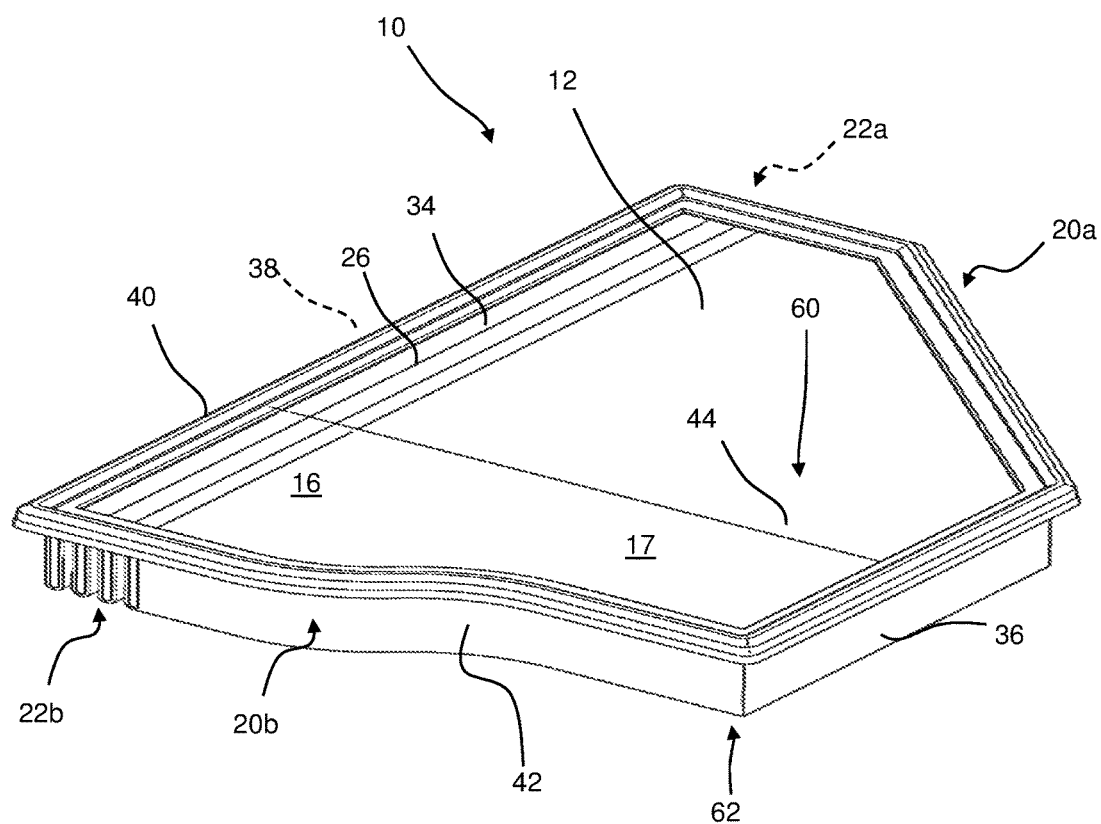
FIG. 4 shows an isometric illustration of a filter element according to an embodiment of the invention with the filter bellows of FIG. 3 and foamed-on seal.

In FIG. 4, a filter element 10 according to an embodiment of the invention with the filter bellows 12 of FIG. 3 and foamed-on seal 40 is isometrically illustrated. The seal 40 in the illustrated embodiment is arranged on the edge which is facing the raw fluid side 60 of the filter bellows 12 so that the possible introduction of dust particles when exchanging a filter element 10 in a filter housing is minimized. Beneficially, for this purpose, a seal that is foamed congruently onto the filter bellows 12, for example, of polyurethane foam, can be used. However, the filter bellows 12 can have a circumferential seal 40 on end edges 22a, 22b, end edge faces 20a, 20b, and end face rims 36, 38 of a raw fluid side 60 and/or of a clean fluid side 62.

Figure 5:
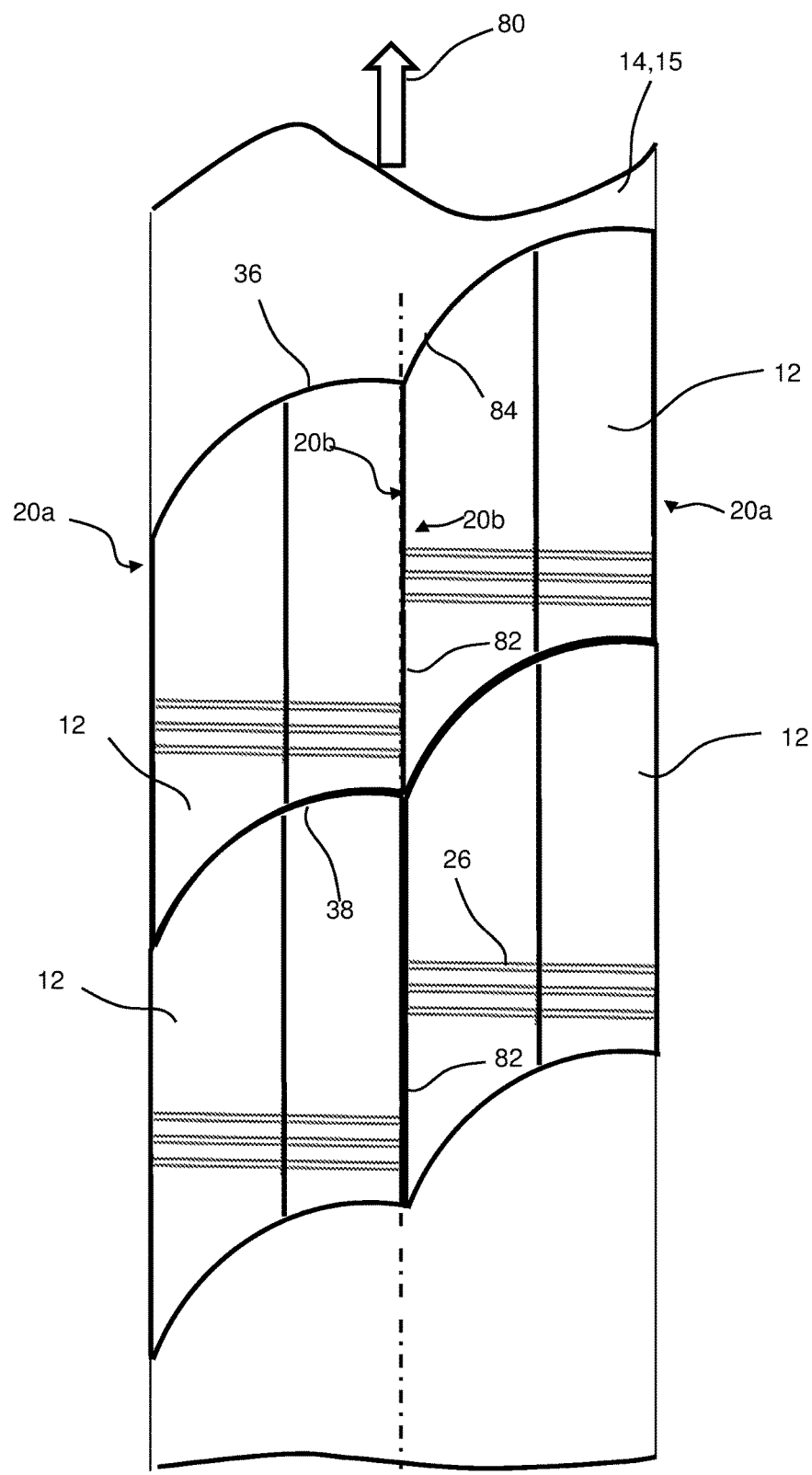
FIG. 5 is a plan view of a bellows of filter medium from which four adjacently positioned filter bellows are cut according to a further embodiment of the invention.

FIG. 5 shows a plan view of a bellows 15 of filter medium 14 from which four adjoining filter bellows 12 are cut according to a further embodiment of the invention. The at least four filter bellows 12 can be produced in parallel in that at least one cutting path 84 is performed transverse and at least one cutting path 82 is performed along the running direction 80. The cutting path 84 experiences in this context a directional change while the cutting path 82 extends along the running direction 80 and experiences no directional change. A leading end face rim 36 and a rear end face rim 38 of a filter bellows 12 are embodied curved in such a way that the two end face rims 36, 38 of two filter bellows 12 that follow each other in running direction 80 of the bellows 15 of the filter medium 14 immediately fit each other. The four filter bellows 12 can be cut from the bellows 15 of the filter medium 14 without cutting scrap and waste between the filter bellows 12 being produced.

Figure 6:
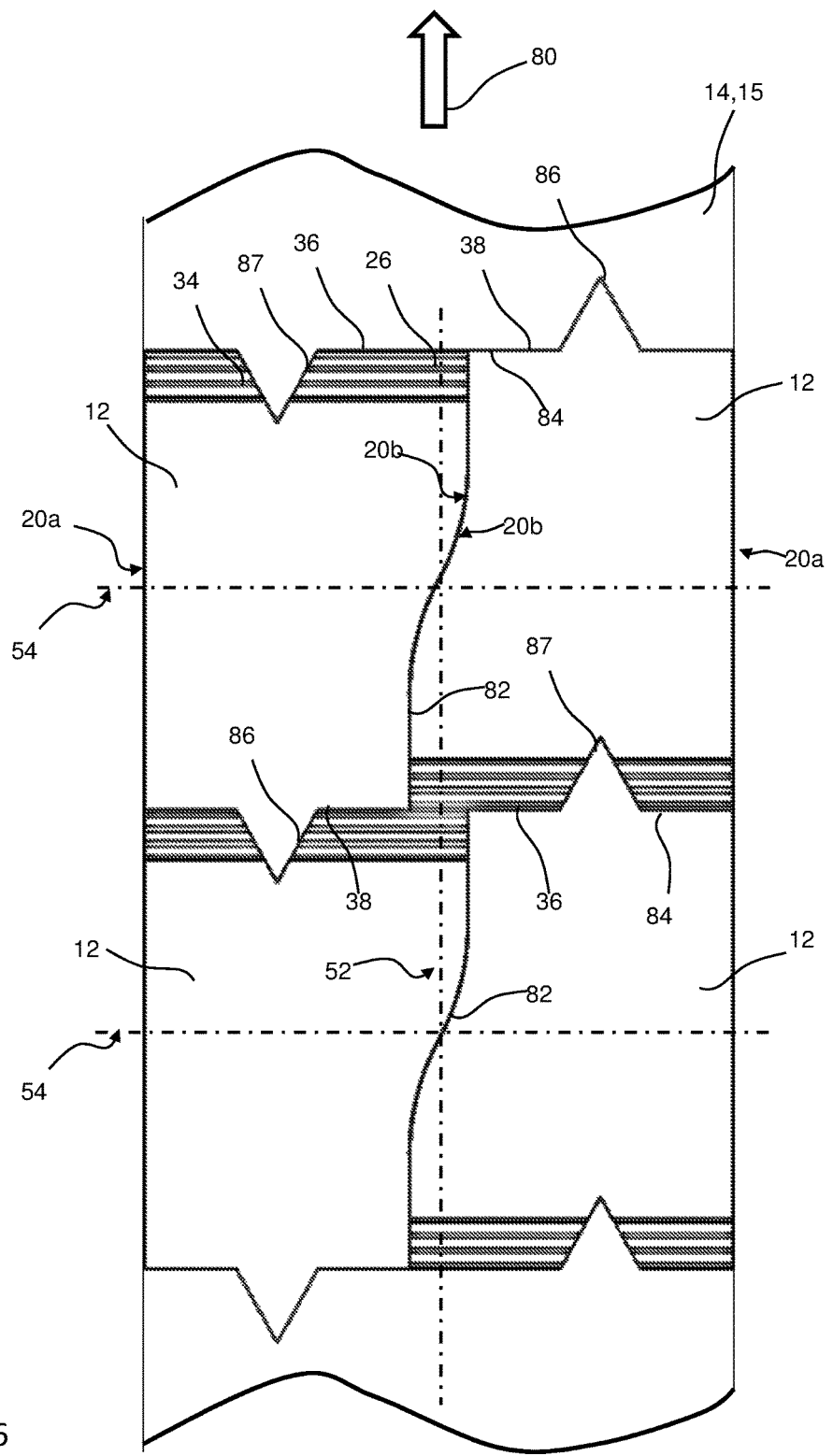
FIG. 6 is a plan view of a bellows of filter medium from which four adjoining filter bellows are cut according to yet another embodiment of the invention.

FIG. 6 shows a plan view of a bellows 15 of filter medium 14 from which four adjoining filter bellows 12 are cut according to yet another embodiment of the invention. Reference characters are provided for reasons of clarity only on two filter bellows because the illustration of the other two filter bellows 12 is doubled. The at least four filter bellows 12 can be produced in parallel in that at least one cutting path 84 is carried out transverse to and at least one cutting path 82 is carried along the running direction 80. The cutting path 82 experiences in this context transverse to the running direction 80 a directional change while the cutting path 84 experiences a directional change along the running direction 80. A leading end face rim 36 and a rear end face rim 38 of a filter bellows 12 are designed complementary to each other by a point symmetry so that the two end face rims 36, 38 of two filter bellows 12, that are following each other in running direction 80 of the bellows 15 of the filter medium 14, immediately fit each other. The four filter bellows 12 illustrated in FIG. 6 are embodied with point symmetry because, by sequential mirroring in the planes 52 and 54 that are perpendicular to the image plane of FIG. 6, they can be transformed into themselves by reflection.

In this way, the four filter bellows 12 of the bellows 15 of the filter medium 14 can be cut without cutting scrap and waste being produced. The contours 86 and 87 in the end face rims 36 and 38 of a filter bellows 12 represent only schematic embodiments and can be provided with corresponding rounded portions.

Figure 7:
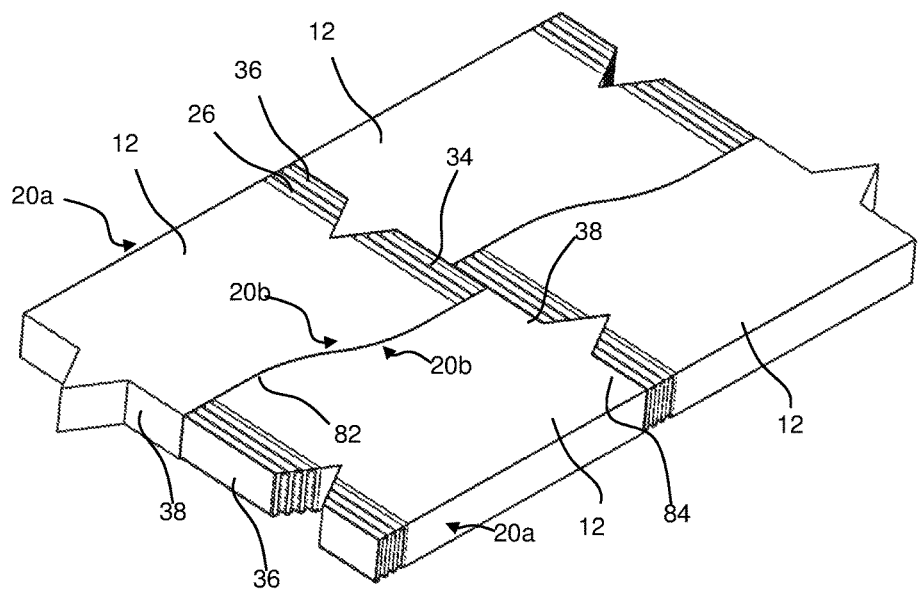
FIG. 7 is an isometric illustration of the four adjoining filter bellows of FIG. 6.

In FIG. 7, the four adjoining filter bellows 12 of FIG. 5 are shown isometrically. Two filter bellows 12 each are positioned directly contacting each other due to the point symmetrically extending end edge faces 20b so that they can be cut from the bellows 15 of the filter medium 14 with a suitably guided cutting path 82 without producing any cutting scrap at the end edge faces 20b, as illustrated in FIG. 1. In running direction 80 of the bellows 15 of the filter medium 14, the end face rims 36, 38 are embodied complementary to each other due to a point symmetry so that two filter bellows 12 each can be positioned directly one behind the other.

The erected folds 34 are shown only in one part of the filter bellows 12. For the remainder of the filter bellows, only the outer contours are illustrated.

Figure 8:
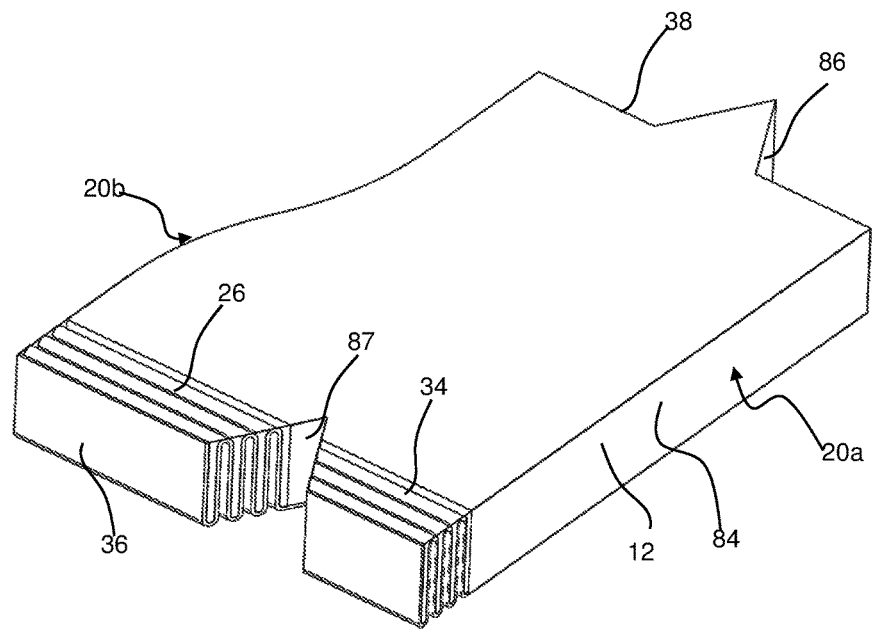
FIG. 8 is an isometric illustration of a filter bellows of FIG. 7.

FIG. 8 illustrates a filter bellows 12 of FIG. 7 isometrically. The end edges 22a of the erected folds 34 can thus be seen clearly. The filter bellows 12 is also illustrated purely schematically. In the illustration, for example, the raw fluid area 60 is above the filter bellows 12 while the clean fluid area 62 is arranged below the filter bellows 12. The folds 34 end at both ends of the filter bellows 12 at the end face rims 36 and 38. The folds 34 have the same fold height 48. A sealant bead 42 for gluing and sealing the end edges 22a, 22b is applied immediately adjacent to the end edges 22a, 22b.

Figure 9:
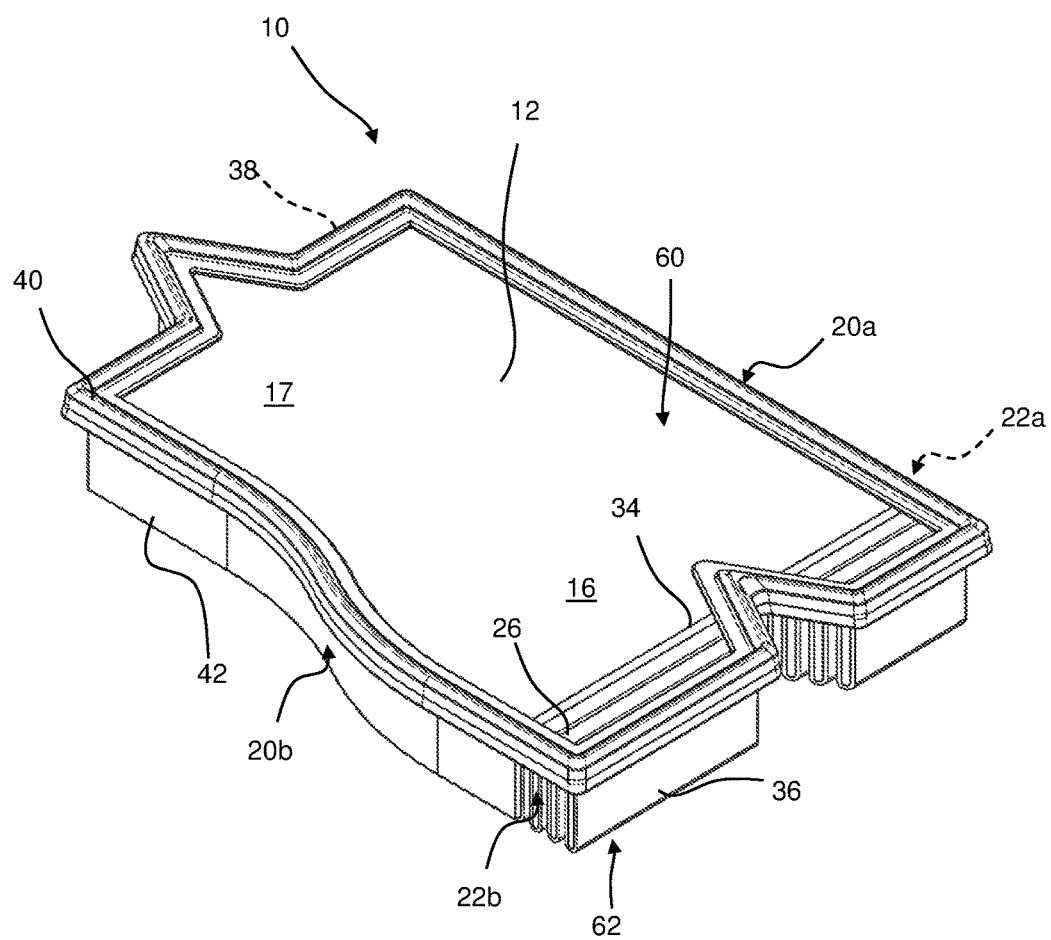
FIG. 9 shows an isometric illustration of a filter element with the filter bellows of FIG. 8 and foamed-on seal according to an embodiment of the invention.

FIG. 9 shows an isometric illustration of a filter element 10 according to an embodiment of the invention with the filter bellows of FIG. 8 and foamed-on seal. The seal 40 in the illustrated embodiment is arranged on the edge which is facing the raw fluid side 60 of the filter bellows 12 so that the possible introduction of dust particles when exchanging a filter element 10 in a filter housing is minimized. Beneficially, for this purpose a seal, for example, of polyurethane foam, can be employed which is foamed congruently onto the filter bellows 12. The filter bellows 12 can however comprise a circumferential seal 40 on end edges 22a, 22b and side edges 23a, 23b of a raw fluid side 60 and/or of a clean fluid side 62.

What is claimed is:

1. A method for producing two or more filter bellows, the method comprising:
   providing a cutting device adapted for cutting a filter bellows having zig-zag erected folds;
   providing a continuous running web of filter bellows comprising a plurality of zigzag shaped erected folds, the plurality of erected folds arranged one after the other in a running direction of the running web of filter bellows, the erected folds having fold edges which extend across a width of the running web of filter bellows, the fold edges arranged traverse to a running direction of the running web of filter bellows;
   carrying out a cutting path in the running web of filter bellows in a direction that, at least in some regions, is transverse relative to the fold edges such that the filter bellows are produced in parallel and the cutting path creates end edge faces and/or side faces of the filter bellows and the filter bellows are embodied lying adjacent to each other and symmetrical or point-symmetrical relative to each other in the running direction and/or transverse to the running direction;
   wherein the cutting path comprises a first cutting path and a second cutting path carried out as follows:
      providing the first cutting path for a first filter bellows to be cut from the running web of filter bellows,
      the first filter bellows having an outer boundary delimited by end face edges and end face rims of the first filter bellows to be cut;
      wherein the first cut path is a path for the cutting device to follow on the running web of filter bellows to cutout the first filter bellows;
      determining the second cutting path to cutout a second filter bellows as a mirrored image of the first cutting path of the first filter bellows,
      either by the steps of:
         mirroring the first cutting path about a first plane, the first plane perpendicular to an image plane of the fold edges of the zig-zag erected folds, the first plane extending in the running direction of the running web of filter bellows;
         mirroring the mirrored first cutting path about a second plane perpendicular to the image plane of the fold edges of the zig-zag erected folds and perpendicular to the first plane, to create the second cutting path of a second filter bellows,
         wherein the first cutting path is arranged on a first portion of the width of the running web of filter bellows;
         wherein the second cutting path is arranged on an adjacent second portion of the width of the running web of filter bellows; and
         wherein the first cutting path and the second cutting path are arranged adjacent to each other in a traverse direction, across the width of the running web of filter bellows so as to reduce cutting scrap and filter medium waste;
      or by the steps of:
         mirroring the first cutting path about a first plane, the first plane perpendicular to an image plane of the fold edges of the zig-zag erected folds, the first plane extending in the running direction of the running web of filter bellows;
         mirroring the mirrored first cutting path about a second plane perpendicular to the image plane of the fold edges of the zig-zag erected folds and perpendicular to the first plane, to create the second cutting path of a second filter bellows,
         wherein the first cutting path and the second cutting path are arranged one behind the other in the running direction and arranged adjacent to each other; and
         wherein the first cutting path and the second cutting path are arranged adjacent to each other in the running direction so as to reduce cutting scrap and filter medium waste;
   using the cutting device, cutting the running web of filter bellows along the first cutting path to cut out the first filter bellows, and cutting the running web of filter bellows along the second cutting path to cut out the second filter bellows from the running web of filter bellows.

2. The method according to claim 1, comprising
carrying out the cutting path with a directional change along the running direction.

3. The method according to claim 2, wherein the directional change is carried out with one or more angles of less than 45°.

4. The method according to claim 2, wherein the directional change is carried out with one or more radii.

5. The method according to claim 1, comprising producing at least four of the filter bellows in parallel by the steps of:
   carrying out the cutting path with the first cutting path and the second cutting path adjacent to each other in a traverse direction, across the width of the running web of filter bellows to produce the first and second filter bellows;
   mirroring the cutting path about a first plane, the first plane perpendicular to an image plane of the fold edges of the zig-zag erected folds, the first plane extending in the running direction of the running web of filter bellows;
   mirroring the mirrored first cutting path about a second plane perpendicular to the image plane of the fold edges of the zig-zag erected folds and perpendicular to the first plane, to create a cutting path for cutting out a third and a fourth filter bellows, wherein the a third and a fourth filter bellows are arranged behind the first and second filter bellows in the running direction.

6. The method according to claim 5, comprising carrying out the cutting path along the running direction with a directional change transverse to the running direction.

7. The method according to claim 6, wherein the directional change is carried out with one or more angles of less than 45°.

8. The method according to claim 6, wherein the directional change is carried out with one or more radii.

9. The method according to claim 1, wherein the filter bellows each a have a leading side face and a rear side face,
   wherein the leading side face and the rear side face are embodied complementary to each other due to a point symmetry.

10. The method according to claim 1, wherein the filter medium comprises cellulose.

11. A filter element for filtering a fluid, the filter element comprising:
   a filter bellows comprising
   a filter medium folded along fold edges in a zigzag shape to folds extending between oppositely positioned end edge faces of the filter bellows, respectively,
   wherein the filter bellows comprises
      opposite side faces connecting the end edge faces,
      wherein the folds along the end edge faces are laterally sealed,
      wherein at least one of the end edge faces and/or one of the side faces experiences a directional change,
      wherein the filter bellows is produced according to the method of claim 1.

12. The filter element according to claim 11, wherein the folds along the end edge faces are laterally sealed by at least one sealant bead or a lateral band.

13. The filter element according to claim 11, wherein the filter bellows comprises
   a circumferentially extending seal on a raw fluid side and/or a clean fluid side of the filter bellows along an edge of the filter bellows facing the raw fluid side and/or the clean fluid, respectively.

14. The filter element according to claim 13, wherein the circumferentially extending seal is foamed onto the filter bellows.

15. A filter system comprising:
   a filter housing comprising
      at least a housing bottom part and
      a housing top part,
      wherein the housing bottom part and the housing top part are fluid-tightly and detachably connected to each other;
   a filter element comprising
      a filter bellows comprising
         a filter medium folded along fold edges in a zigzag shape to folds extending between oppositely positioned end edge faces of the filter bellows, respectively,
      wherein the filter bellows comprises
         opposite side faces connecting the end edge faces,
         wherein the folds along the end edge faces are laterally sealed,
         wherein at least one of the end edge faces and/or one of the side faces experiences a directional change,
      wherein the filter element is arranged exchangeable in the filter housing and
      wherein the filter element separates fluid-tightly a raw fluid side from a clean fluid side of the filter system,
      wherein the filter bellows is produced according to the method of claim 1.

16. The filter system according to claim 15 embodied as an air filter for an internal combustion engine.

17. The method according to claim 1, wherein the cutting device is a laser cutting device.

* * * * *